(12) United States Patent
Warner et al.

(10) Patent No.: US 8,467,436 B1
(45) Date of Patent: Jun. 18, 2013

(54) DSP-BASED DIAGNOSTICS FOR MONITORING A SERDES LINK

(75) Inventors: William Dean Warner, Maple Ridge (CA); Graeme B. Boyd, North Vancouver (CA); William Michael Lye, Coquitlam (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 800 days.

(21) Appl. No.: 12/627,667

(22) Filed: Nov. 30, 2009

Related U.S. Application Data

(60) Provisional application No. 61/173,857, filed on Apr. 29, 2009.

(51) Int. Cl.
*H04B 1/38* (2006.01)

(52) U.S. Cl.
USPC .......................................................... 375/219

(58) Field of Classification Search
USPC .......... 375/219, 233, 316, 323, 350; 341/137, 341/144, 155; 327/141
See application file for complete search history.

(56) References Cited

U.S. PATENT DOCUMENTS

| | | | |
|---|---|---|---|
| 6,463,109 B1 | 10/2002 | McCormack et al. | |
| 6,538,475 B1 | 3/2003 | Johansen et al. | |
| 6,587,530 B1 | 7/2003 | Conklin et al. | |
| 6,640,193 B2 | 10/2003 | Kuyel | |
| 6,694,462 B1 | 2/2004 | Reiss et al. | |
| 6,836,738 B2 | 12/2004 | Sepp et al. | |
| 6,873,939 B1 | 3/2005 | Zerbe et al. | |
| 6,895,535 B2 | 5/2005 | Sunter et al. | |
| 6,931,349 B2 | 8/2005 | Jang | |
| 7,006,932 B1 | 2/2006 | Liaw et al. | |
| 7,076,377 B2 | 7/2006 | Kim et al. | |
| 7,143,323 B2 | 11/2006 | Sweet | |
| 7,185,252 B2 | 2/2007 | Choi | |
| 7,194,365 B1 | 3/2007 | Sonntag | |
| 7,262,621 B1 | 8/2007 | Caffee et al. | |
| 7,295,604 B2 | 11/2007 | Cranford, Jr. et al. | |
| 7,360,127 B2 | 4/2008 | Zerbe et al. | |
| 8,040,940 B2 * | 10/2011 | Satou | 375/221 |
| 2009/0224809 A1 * | 9/2009 | Matsumoto et al. | 327/141 |

OTHER PUBLICATIONS

Bergmans, "Effect of Loop Delay on Phase Margin of First Order and Second-Order Control Loops", IEEE Transactions on circuits and systems, vol. 52, No. 10, Oct. 2005, pp. 621 to 625.

* cited by examiner

*Primary Examiner* — Khai Tran
(74) *Attorney, Agent, or Firm* — Dennis R. Haszko

(57) ABSTRACT

A method to look at the incoming received data on a SerDes link while running in normal operation without requiring a second receive path or any defined or repeated data patterns to be able to generate statistical eye plots both before and after any internal equalization; generate trajectory eye plots both before and after any internal equalization; estimate TED characteristics (hence also estimate SJ jitter tolerance of the link); estimate complete Channel Impulse Response (hence also estimate the S-parameters of the complete channel); and estimate the decomposed jitter of the complete channel.

21 Claims, 15 Drawing Sheets

DSP-BASED DIAGNOSTICS FOR MONITORING A SERDES LINK

CROSS REFERENCE TO RELATED APPLICATIONS

This application claims the benefit of priority of U.S. Provisional Patent Application No. 61/173,857 filed Apr. 29, 2009, which is incorporated herein by reference in its entirety.

FIELD

The present application relates generally to communication systems. More particularly, the present application relates to monitoring performance of a communication link.

BACKGROUND

A Serializer/Deserializer (SerDes) is an integrated circuit transceiver that facilitates that transmission of parallel data between two points over serial streams. A SerDes includes a transmitter section that converts parallel data to serial data, and a receiver section that converts serial data to parallel data.

In a SerDes link, it can be desirable to know the margin of the link before the link will degrade (that is it starts to have a significant number of errors). It is important to monitor the margin of SerDes links to ensure that the bit error rate (BER) is low enough for a particular application.

One approach is to monitor the receive signal at the integrated circuit (IC) pins. However, such monitoring can be very misleading due to package effects, and internal processing (i.e. equalization) within the IC. Moreover, it can be difficult to access the IC pins without distorting the receive signal.

Typically, most SerDes standards target a 10-12 BER (that is at most a single bit error within one Tera-bit of data), and some standards are calling for a BER of 10-15 (that is at most a single bit error within one Peta-bit of data).

Having a method to show the margins of a link gives a better sense that the link is performing to specification, as test times can be very long. Such methods can also be used to track down problems (worse than expected bit error rate, one link out of many having a worse BER than the others, etc).

There are several known methods available to determine the margin of a SerDes link. Metallic loop-back involves taking the receive (Rx) signal and sending it back out the transmit (Tx) port of the integrated circuit without doing any clock recovery. This allows one to see the data at the Rx pins without distorting the signal (but it does add "jitter" and "noise" due to the analog stages in the Tx path); however one has to have a separate Tx port available or no longer have a "normal" link (as the Tx side is not working normally). Given this data, one can process it off-line to get the confidence that the Rx side of the link will work correctly.

Another known method available to determine the margin of a SerDes link is to generate internal eye diagram plots, which are pictures of what the eye diagram looks like within the integrated circuit. These can be presented as either statistical eye plots or trajectory plots and typically requires either an extra Rx path or can only be used in a "test" mode.

A still other known method available to determine the margin of a SerDes link is to use bit error rate (BER) checkers when the SerDes link is in a "test" mode. This involves sending known patterns (for example PRBS-31) from the transmitter to the receiver of the SerDes and having a BER monitor on chip indicate the number of errors. This requires the chip to be in a "test" mode.

Most communication protocols have some capabilities for monitoring performance of a communication link such as cyclic redundancy check (CRC) or binary interface parity (BIP) but their usefulness vary greatly. Mostly, these methods just state that 1 or more errors have happened in the last frame/packet and there is a need to either drop the frame/packet or ask it to be resent. These methods do not give the real number of bit errors, thus making it difficult to estimate margins.

Current SerDes receivers have built in capabilities to monitor the margins in a SerDes link to ensure that the link is performing to specification. These methods include receiving the data at the slicer output and offsetting the slicer level in order to assess the amplitude margin of the link. Another method involves receiving the data at the slicer output and offsetting the sampling time of the slicer in order to determine the timing margin of the link. A third method involves receiving the data at the slicer output and adding a current/voltage to input signal of the slicer in order to assess the amplitude margin of the link. In all of these methods the bit-error rate at the output of the SerDes receiver is measured in order to assess the margin, and they all require that the SerDes link is operating in a special test mode.

Some drawbacks to the current methods for monitoring the margins in a SerDes link include: they require the SerDes to be operating in a special test mode; or they require a full second receiver path in addition to the existing receive data path so as to not disrupt the normal operation of the SerDes link. Furthermore, some of the current methods mentioned above also require a special repeating test data stream to be sent to the receiver.

It is, therefore, desirable to provide an improved method for assessing the performance of a SerDes link.

BRIEF DESCRIPTION OF THE DRAWINGS

Embodiments of the present application will now be described, by way of example only, with reference to the attached Figures, wherein.

DETAILED DESCRIPTION

Figure 1:
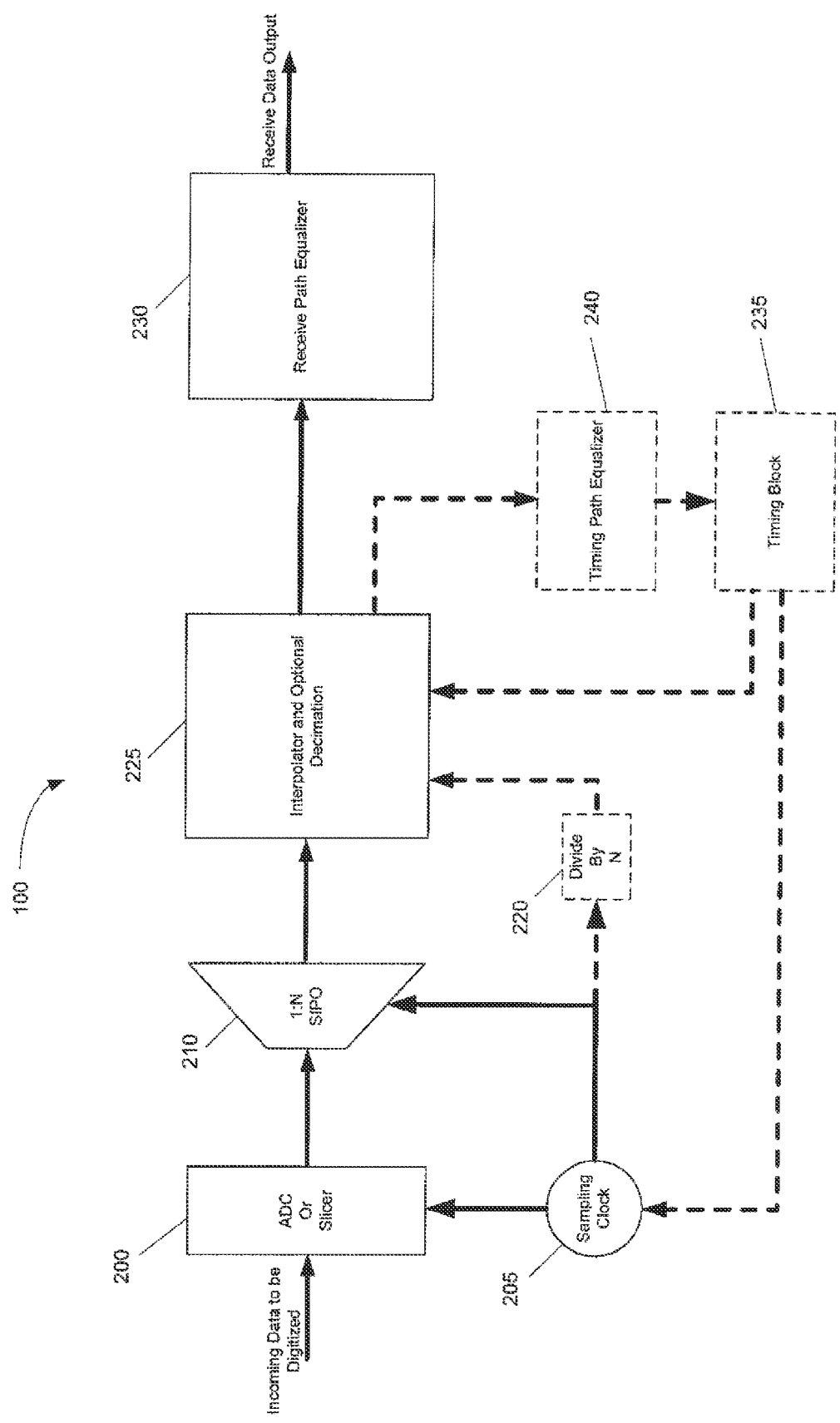
FIG. 1 is a block diagram of a SerDes receive path.

Generally, the present application provides a method and apparatus for DSP-based diagnostics for monitoring a SerDes link. A method is provided to look at the incoming received data on a SerDes link while running in normal operation without requiring a second receive path or any defined or repeated data patterns to be able to: generate statistical eye plots both before and after any internal equalization; generate trajectory eye plots both before and after any internal equalization; estimate the Timing Block characteristics and the Sinusoidal Jitter (SJ) jitter tolerance of the link; estimate the complete Channel Impulse Response and the S-parameters of the complete channel; and estimate of the decomposed jitter of the complete channel.

The term "digitized samples" as used herein represents periodic quantized values of an analog signal received at the input of the SerDes receiver.

The term "timing information" as used herein represents the information about the frequency of the transmit signal received at the input of the SerDes receiver.

The term "received signal waveform" as used herein represents an analog signal that appears at the input of the SerDes receiver after transmission over a medium such as air, copper, fiber, etc.

The term "reconstructed received signal waveform" as used herein represents a quantized and interpolated representation of the analog signal that appears at the input of the SerDes receiver.

The term "equalized signal waveform" as used herein represents a signal that appears at the output of an equalization device that corrects for impairments in the analog signal that appears at the input of the SerDes receiver after transmission over a medium such as air, copper, fiber, etc.

The term "performance" as used herein represents a measure of the difference between data transmitter into a medium by a SerDes transmitter and a data signal at the output of the SerDes receiver. Monitoring margins is one example of determining performance of a SerDes link.

In an embodiment, the present application provides a method of determining performance of a SerDes link including a receive path. The method includes the following steps: obtaining digitized samples spanning multiple baud periods of a received signal waveform during normal operation in the receive path of a SerDes receiver; obtaining timing information; capturing the obtained digitized samples into a memory; reconstructing the received signal waveform and an equalized signal waveform based on the captured digitized samples of the received signal waveform and on the obtained timing information without affecting normal operation of the SerDes link in the receive path; and determining performance of the SerDes link on the basis of the reconstructed received signal waveform and the reconstructed equalized signal waveform.

Obtaining the timing information can include reading the timing information from the receive path during normal operation, or generating the timing information from the captured digitized samples. Obtaining digitized samples can include obtaining a block of digitized samples using block sub-sampling. Block sub-sampling can include sampling the received signal waveform at more than twice a maximum signal frequency of the received signal waveform while only examining small blocks of the received signal waveform at a time. The small blocks of the received signal waveform can comprise at least four unit intervals. Obtaining digitized samples comprises obtaining digitized samples using all incoming data associated with the received signal waveform.

Obtaining timing information can further include storing the obtained timing information in the sample memory, or calculating the timing information. The method can further include, after obtaining timing information, obtaining equalizer information from the receive path during normal operation. Reconstructing the equalized received waveform can be based on the digitized samples of the received signal waveform, the obtained interpolator timing information and the obtained equalizer information without affecting normal operation of the SerDes link in the receive path.

Obtaining equalizer information from the receive path during normal operation can further include storing the obtained equalizer information in the sample memory, or calculating the equalizer information.

The obtained digital samples can be captured into an N-bit wide block memory. Determining performance of the SerDes link can include monitoring margins of the SerDes link.

Obtaining digitized samples can include capturing a block of digitized samples at an output of an oversampled analog-to-digital converter of the SerDes receiver during normal operation of the SerDes link. Obtaining timing information can include capturing timing information from a timing block of the SerDes receiver during normal operation of the link. Capturing the obtained digital samples can include storing the block of digitized samples in the memory. Reconstructing the received signal waveform and the equalized signal waveform can include interpolating the stored block of input samples based on the captured timing information to reconstruct a digital representation of the received signal waveform at a finer time resolution than provided by the oversampled analog-to-digital converter. Determining the performance of the SerDes link can be based on the interpolated digital representation of the received signal waveform and an equalized digital representation of the reconstructed signal waveform.

Determining the performance of the SerDes link can be performed on a sub-sampled set of the reconstructed waveform. Determining the performance of the SerDes link can include: generating a statistical eye plot using the reconstructed waveform and the equalized reconstructed waveform; generating bathtub plots using the reconstructed waveform and the equalized reconstructed waveform; generating trajectory eye plots using the reconstructed waveform and the equalized reconstructed waveform; and/or generating an estimation of timing block, or timing error detection (TED), characteristics using the reconstructed waveform and the equalized reconstructed waveform. The TED characteristics can be used to estimate SJ jitter tolerance of the link.

Determining the performance of the SerDes link can include generating an estimation of complete channel impulse response using the reconstructed waveform and the equalized reconstructed waveform.

The method can further include running the complete Channel Impulse Response into a DFT (Discrete Fourier Transform) to estimate the S-parameters of the complete channel. Determining the performance of the SerDes link can include generating an estimation of decomposed jitter of the complete channel using the reconstructed waveform and the equalized reconstructed waveform.

In a further embodiment, the present application provides a computer readable memory storing statements and instructions for execution by a processor to perform a method of determining performance of a SerDes link including a receive path. The method performed by the processor includes the following steps: obtaining digitized samples spanning multiple baud periods of a received signal waveform during normal operation in the receive path of a SerDes receiver; obtaining timing information capturing the obtained digitized samples into a memory; reconstructing the received signal waveform and an equalized signal waveform based on the captured digitized samples of the received signal waveform and on the obtained timing information without affecting normal operation of the SerDes link in the receive path; and determining performance of the SerDes link on the basis of the reconstructed received signal waveform and the reconstructed equalized signal waveform. Obtaining timing information can include reading the timing information from the receive path during normal operation, or generating the timing information from the captured digitized samples.

FIG. 1 is a block diagram of a prior art SerDes receive path 100. The receive path 100 includes an analog-to-digital (ADC) converter or slicer 200 that receives a serial analog waveform from a receive port of the SerDes integrated circuit. The receive path 100 further includes a serial-in-parallel out (SIPO) shift register 210 connected to the output of the ADC 200, an interpolator 225 connected to the output of the SIPO shift register 210 and an equalizer 230 connected to the output of the interpolator 225. The receive path 100 also includes a sampling clock 205 connected to the ADC 200 and the SIPO shift register 210. Optionally, the sampling clock 205 is connected to a divide by N block 220. A timing block 235 can be connected to the interpolator. Optionally, the receive path 100 can also include a timing path equalizer 240 connected to an output of the interpolator 225 and to the sampling clock 205 via timing block 235, providing a synchronous receiver.

In normal operation, a serial waveform is received in the receive path 100 at the analog to digital converter 200 where the analog waveform needs to sample at a rate equal to or greater than two times the symbol rate divided by two. That is, it needs to be sampled at or higher than the symbol rate. As is known in the art, the symbol rate is also known as the baud or modulation rate, and defines the number of symbol changes made to a transmission medium per second using a digitally modulated signal or a line code. The operation of the receive path in normal operation would be understood by a person of ordinary skill in the art and is therefore not explained in further detail.

To determine the performance of the SerDes link in the receive path 100, conventional approaches place the receive path 100 in a "test" mode. These known methods involve receiving data at the ADC or slicer output and offsetting the ADC or slicer level in order to assess the amplitude margin of the link; receiving data at the ADC or slicer output and offsetting the sampling time of the ADC or slicer 200 in order to determine the timing margin of the link; and receiving data at the ADC or slicer output and adding a current/voltage to input signal of the ADC or slicer 200 in order to assess the amplitude margin of the link. The drawback of these conventional approaches is that the receive path 100 must be placed in a "test" mode.

Figure 2:
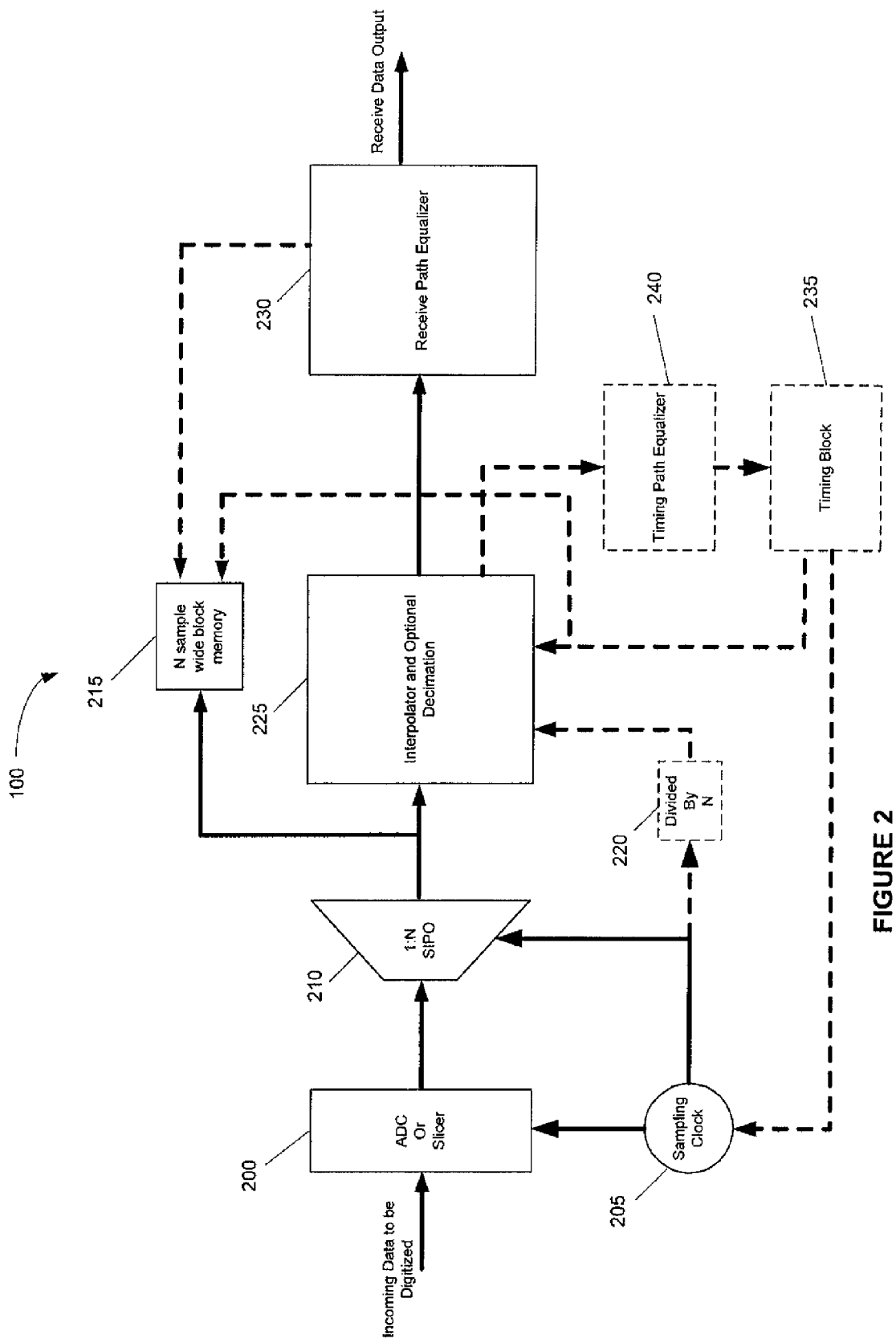
FIG. 2 is a block diagram of a SerDes receive path of an embodiment of the present application.

FIG. 2 shows a block diagram of the receive path of an embodiment of the present application. It should be noted that all reference numerals in FIGS. 1 and 2 represent common functional blocks. Referring to FIG. 2, the receive path 100 of the present application includes an N-bit wide memory block 215 connected to the output of the SIPO shift register 210 and optionally to the output of the timing block 235. The memory block 215 stores a duplicate of the digitized samples output from the ADC 200, which are provided to the interpolator 225. Embodiments of the present application can be implemented in an asynchronous or a synchronous receiver.

Figure 3:
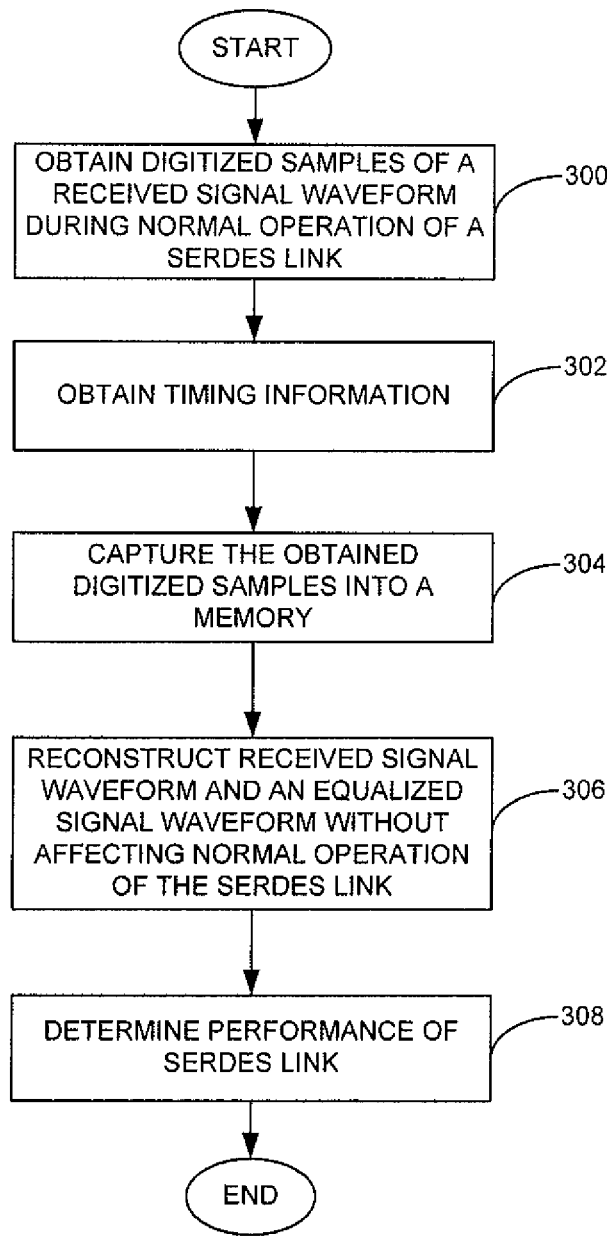
FIG. 3 shows a flowchart illustrating an example embodiment of a method of determining the performance of a SerDes link in a receive path.

FIG. 3 shows a flowchart illustrating an example embodiment of a method of determining the performance of the SerDes link in the receive path 100 shown in FIG. 2. The steps of FIG. 3 can be carried out by routines or subroutines of software executed by, for example, a microprocessor (not shown) connected to the N-bit wide memory block 215 via, for example, a "test" port of the SerDes receiver. Coding of software for carrying out such steps is well within the scope of a person of ordinary skill in the art.

In normal operation, the receive path 100 of the SerDes link receives a signal waveform transmitted across the SerDes link at a "receive" port of the SerDes receiver. To determine the performance of the SerDes link in the receive path 100, digitized samples, or blocks of digitized samples, spanning multiple baud periods of a received signal waveform are obtained in step 300 while the SerDes receiver is operating in a "normal" mode. The blocks of digitized samples can be obtained a using block sub-sampling or using all incoming data associated with the received signal waveform. Block sub-sampling can involve sampling the received signal waveform at or above a symbol rate while only examining small blocks of the received signal waveform at a time. The small blocks of the received signal waveform can include at least four unit intervals. Obtaining the digizited samples can further include capturing a block of digitized samples at an output of the oversampled ADC 200 of the SerDes receiver during normal operation of the SerDes link.

The method illustrated in the flowchart of FIG. 3 then proceeds to step 302, where the timing information is obtained. The timing information can be obtained by reading the timing information from the receive path 100 during normal operation of the SerDes receiver or by generating the timing information from the captured digitized samples. The timing information can be obtained by capturing timing information from the timing block 235 during normal operation of the SerDes link. When the timing information is read from the receive path 100 in step 302, it can be stored in the N-bit wide memory block 215 or it can be calculated from the digitized samples obtained in step 300.

The method then proceeds to step 304 where the obtained digitized samples are captured. Preferably, the obtained digitized samples are captured into the N-bit wide memory block 215. In a further example embodiment of the method illustrated in the flowchart of FIG. 3, the blocks of digitized samples obtained in step 300 are captured in step 304 and stored in the N-bit wide memory block 215. Once the digitized samples are captured, the method proceeds to step 306 where the received signal waveform and an equalized signal waveform are reconstructed based on the digitized samples captured in the in step 304, and based on the timing information obtained in step 302 without affecting normal operation of the SerDes link in the receive path 100.

The method then proceeds to step 308 where the performance of the SerDes link is determined on the basis of the reconstructed received signal waveform and the reconstructed equalized signal waveform. The performance of the SerDes link can be determined in step 308 by monitoring margins of the SerDes link.

The example embodiment of the method illustrated in the flowchart of FIG. 3 method can optionally include, after step 308, the step of obtaining equalizer information from the receive path 100 during normal operation of the SerDesk link. The obtained equalizer information can be obtained by calculating the equalizer information from the digitized samples obtained in step 300. Optionally, the obtained equalizer information can be stored in the N-bit wide memory block 215.

The example method illustrated in FIG. 3 can also include the step of reconstructing the equalized received waveform based on the digitized sample of the received waveform obtained in step 300, the timing information obtained in step 302, and the obtained equalizer information without affecting normal operation of the SerDes link in the receive path 100. Reconstructing the received signal waveform and the equalized signal waveform can include interpolating block of input samples stored in step 304 based on the timing information obtained and captured in step 302 in order to reconstruct a digital representation of the received signal waveform at a finer tme resolution in step 306 than is provided by the oversampled ADC 200 of FIG. 2. Optionally, the performance os the SerDes link in step 308 is determined based on the interpolated digital representation of the received signal waveform and an equalized digital representation of the reconstructed signlal waveform.

An example of the operation of the receive path 100 shown in FIG. 2 will now be described with reference to the flowchart shown in FIG. 4, which shows two independent processing paths 401 and 402. The processing path 401 on the left of FIG. 4 *describes* the steps for collecting and storing the raw statistics from the receive path 100 in FIG. 2. These steps correspond to steps 300, 302, and 304 of the flowchart shown in FIG. 3. The processing path 402 on the right describes the steps for transforming the collected raw statistics into statistical eye plots and BER bathtub curves. Both processes 401 and 402 begin with a common step 400 of starting the signal diagnostics.

Figure 4:
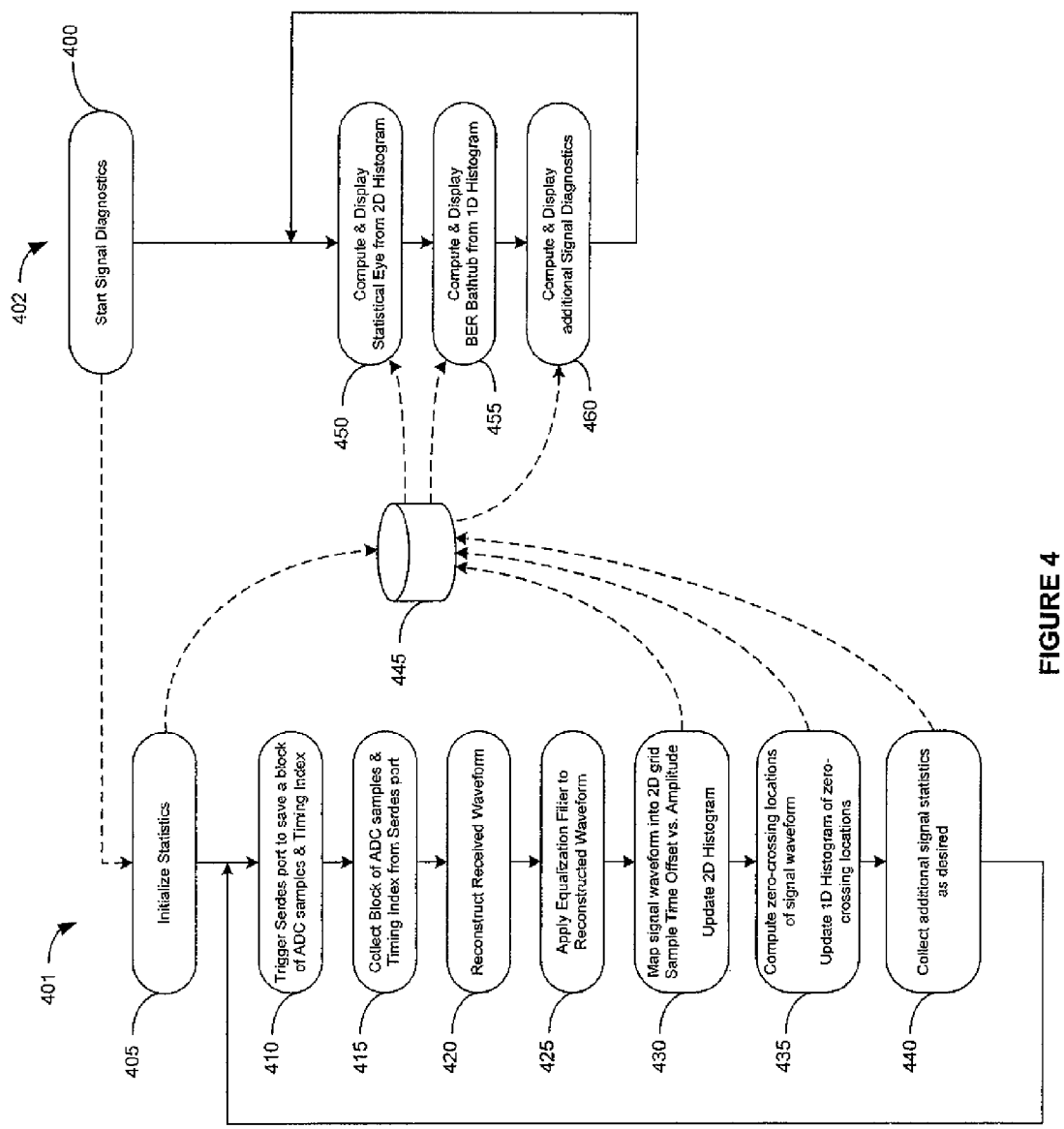
FIG. 4 is a flow-chart of a method of evaluate performance of a SerDes link according to an embodiment of the present application.

With reference to the processing path 401 in FIG. 4, the steps for collecting raw statistics from the receive path 100 of FIG. 2 and storing them in the N-bit wide memory block 215 of FIG. 2 are shown. Step 405 of processing path 301 involves initializing the variables within the memory 215 for storing statistics which will be computed in further steps of the processing path 401. The processing path 401 then proceeds to step 410 where a trigger is sent to the SerDes port (not shown) of the receive path 100 (FIG. 2) to capture a block of ADC samples output from the ADC 215 and the optional timing information output from the timing block 235. Preferably, the tap values being used in the equalization block 230 are also captured and stored in the N-bit wide memory block 215. It should be noted that in the receive path 100 of FIG. 2, the N-bit wide memory block 215 captures blocks of data that can be processed by either dedicated hardware, firmware running on a microprocessor (not shown) in the SerDes, or software running on an external microprocessor. All processing shown in FIG. 4 can be performed by some combination of dedicated hardware, firmware running on a microprocessor embedded within the SerDes, and software running on an external microprocessor, depending on performance and cost considerations.

The processing path 401 then proceeds to step 420 to reconstruct the received signal waveform at a finer time resolution than provided by the SerDes ADC sampling process using the stored ADC samples. This step corresponds to step 306 of the flowchart shown in FIG. 3. Optionally, the timing information or the tap values stored in the memory 215 can also be used to reconstruct the received signal waveform at a finer time resolution than provided by the SerDes ADC sampling process. Preferably, step 420 is done with the same interpolation architecture used by the interpolator block 225 within the SerDes receive path 100. The processing path 401 then proceeds to step 425 where an equalizer is applied to the reconstructed signal waveform. This equalizer is typically equivalent to the equalization performed by the SerDes. The original reconstructed signal waveform obtained in step 420 and the equalized signal waveform obtained in step 425 is used in all further diagnostics signal processing. After step 425, the process moves to step 430 to determine the performance of the SerDes link. This step corresponds to step 308 of FIG. 3. In step 430, a two-dimensional histogram of signal amplitude vs. relative timing (location of sample in time relative to timing position indicated by SerDes) is updated. Histograms for both the non-equalized and equalized signals can be maintained. This 2D histogram information is used as the basis for computing a statistical eye plot.

The location of all zero-crossings is then computed in step 435 for the non-equalized and/or the equalized signal obtained in steps 420 and 425. The time resolution can be the same as the signal reconstruction, or with greater precision as can be desired. A histogram of the relative timing location of the zero crossings is updated in step 435. This 1D histogram is used as the basis for a BER Bathtub plot.

Additional signal statistics can be computed as desired in step 440.

In parallel to the collection of signal statistics, another process 402 can periodically examine the collected statistics obtained in step 440 and transform the raw statistics into formats more easily understood by a user, such as a statistical eye plot (step 450) or BER bathtub plot (step 455).

It should be noted that this signal processing can be done in hardware, an on-chip microprocessor, or an off-chip microprocessor. The captured data is retrieved from the memory 215 for processing by the hardware or microprocessor (not shown) based firmware.

Figure 5:
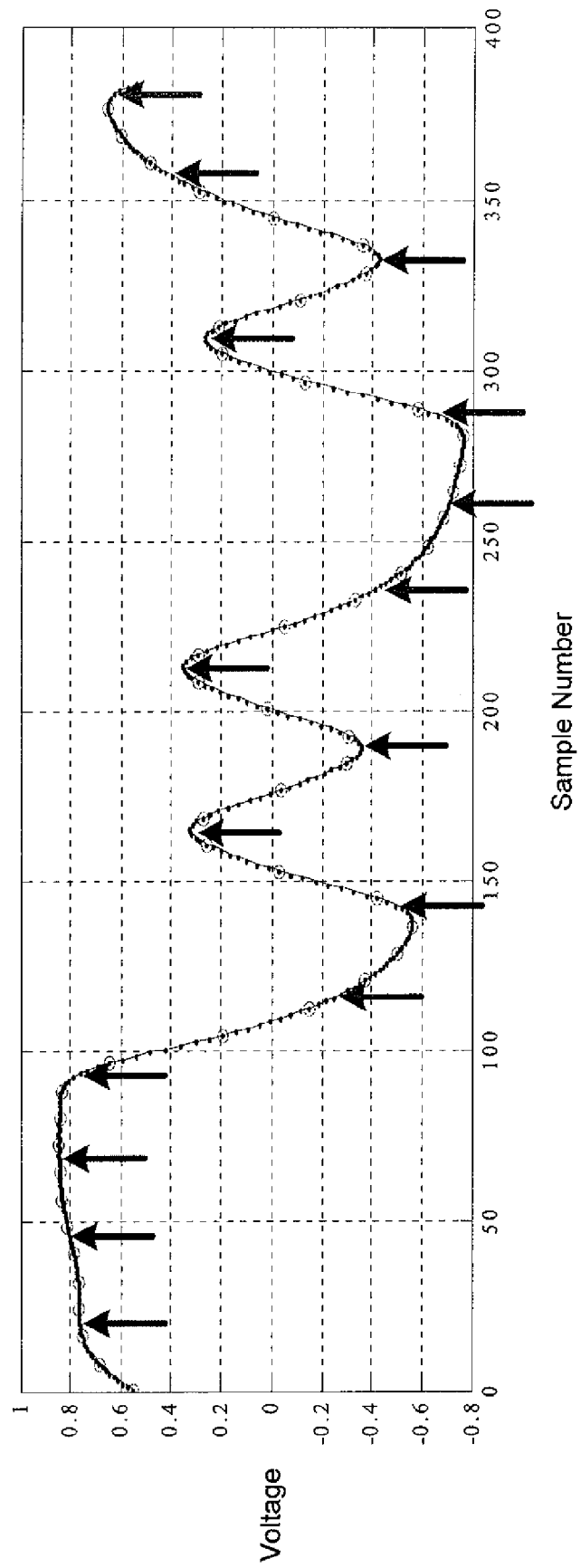
FIG. 5 is a diagram of an exemplary reconstructed waveform received by the SerDes receive path of FIG. 2.
Figure 6:
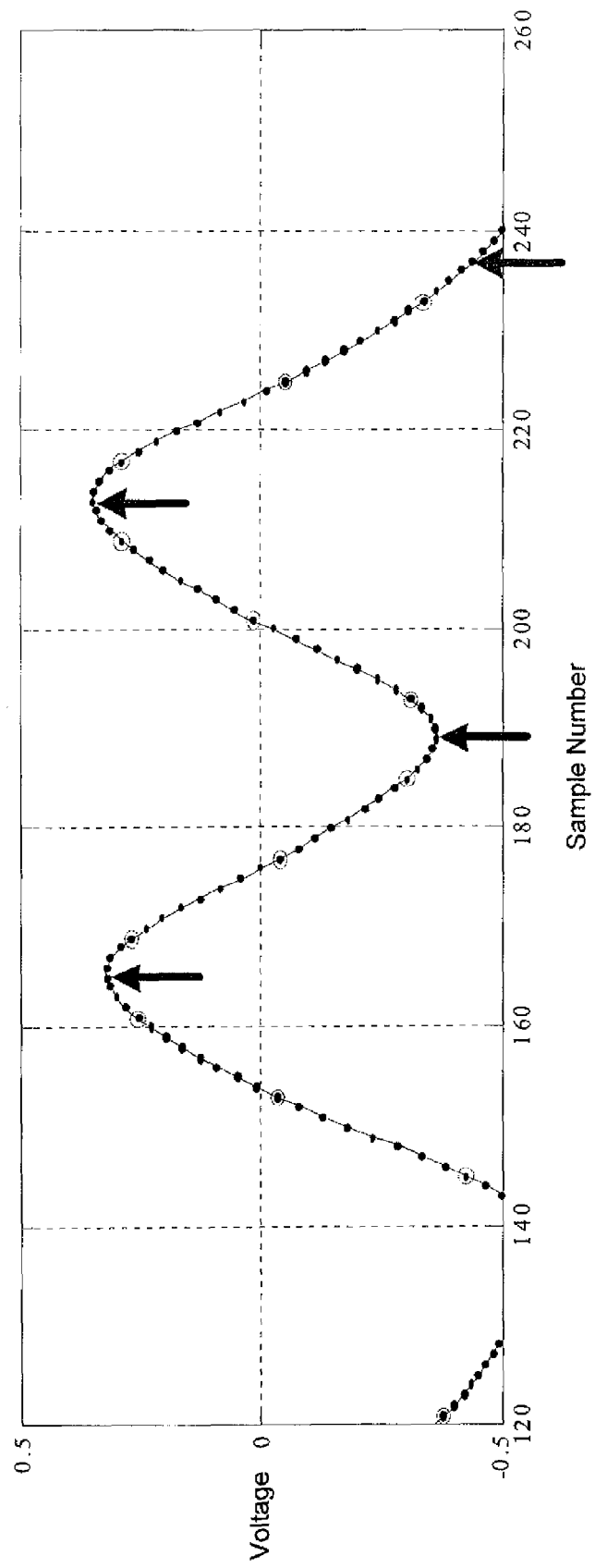
FIG. 6 is a magnified version of a portion of the diagram of FIG. 5.

FIG. 5 illustrates a waveform spanning several baud (the captured block of data), whereas FIG. 6 is a close-up of a portion of FIG. 5. The circles represent the ADC samples and the dots represent all interpolated points possible in the hardware DSP interpolation block. The arrows represent the timing point that the timing recovery block has picked for this waveform. Thus, for each block of collected data, one can update the histogram of signal amplitudes at the timing locations indicated by the timing block. Offsetting these timing points by the resolution of the interpolation block, one can update the histogram of signal amplitudes at the offset timing locations as well. One can then convert this resulting histogram into a probability and display it using a function such as Matlab's "contourf( )". A plot such as shown in the upper half of FIG. 7 can be created on that basis.

Figure 7:
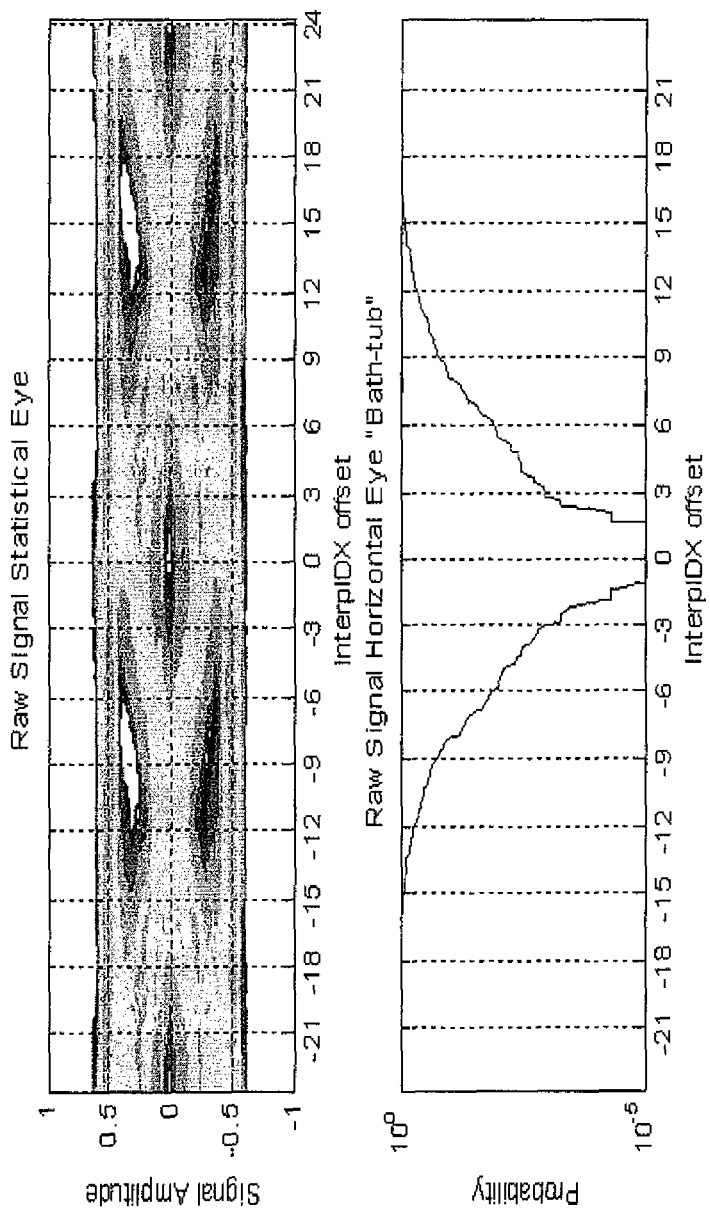
FIG. 7 illustrates an exemplary statistical eye diagram and bathtub curve of the raw samples before equalization in the receive path as produced in accordance with an embodiment of the present application.
Figure 8:
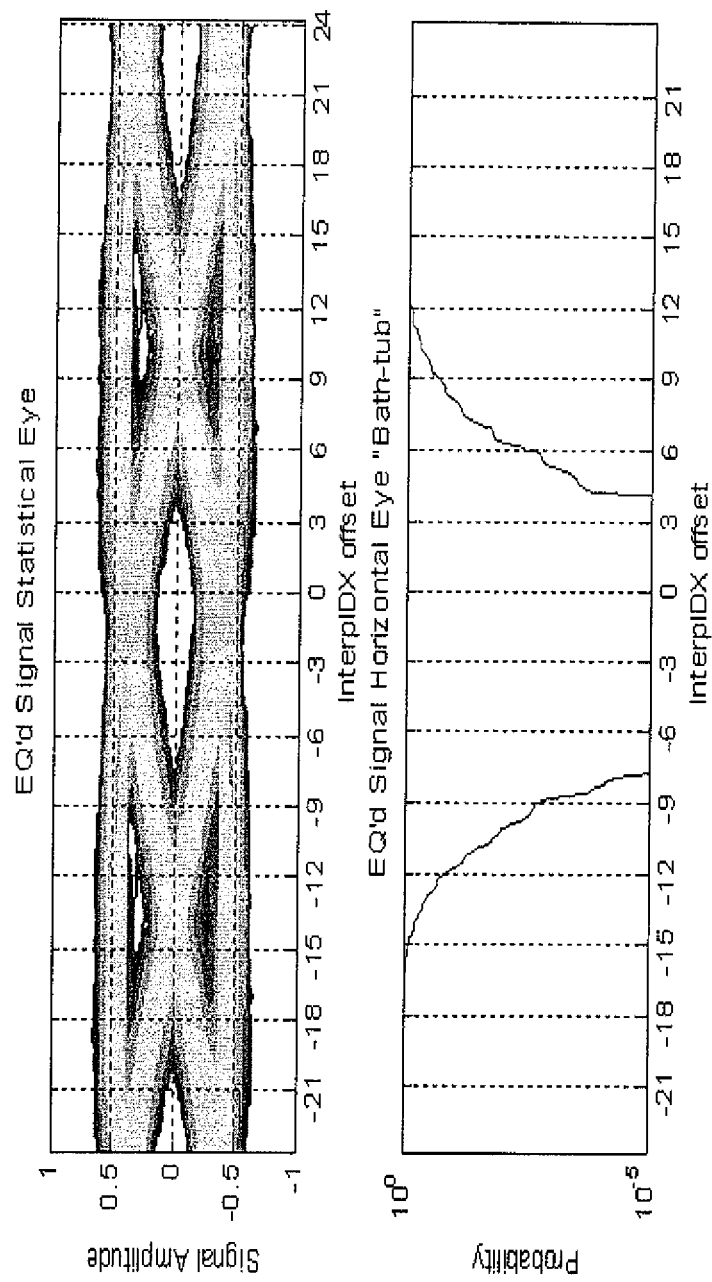
FIG. 8 illustrates an exemplary statistical eye diagram and bathtub curve of the raw samples after equalization in the receive path as produced in accordance with an embodiment of the present application.

FIG. 7 illustrates an exemplary statistical eye diagram and bathtub curve of the raw samples before equalization in the receive path, as produced in accordance with an embodiment of the present application. The visual statistical eye in the upper half of FIG. 7 is meant as a qualitative plot, while a bathtub curve in the lower part of FIG. 7 (which can also be derived from the histogram data—typically by using finer interpolation than the hardware interpolation block does) provides more detailed and accurate information. Further, by knowing the equalization tap values and the type of equalizer used in the hardware, this can be done to generate post-equalized plots as well. FIG. 8 illustrates an exemplary statistical eye diagram and bathtub curve of the raw samples after equalization in the receive path as produced in accordance with an embodiment of the present application.

Figure 9:
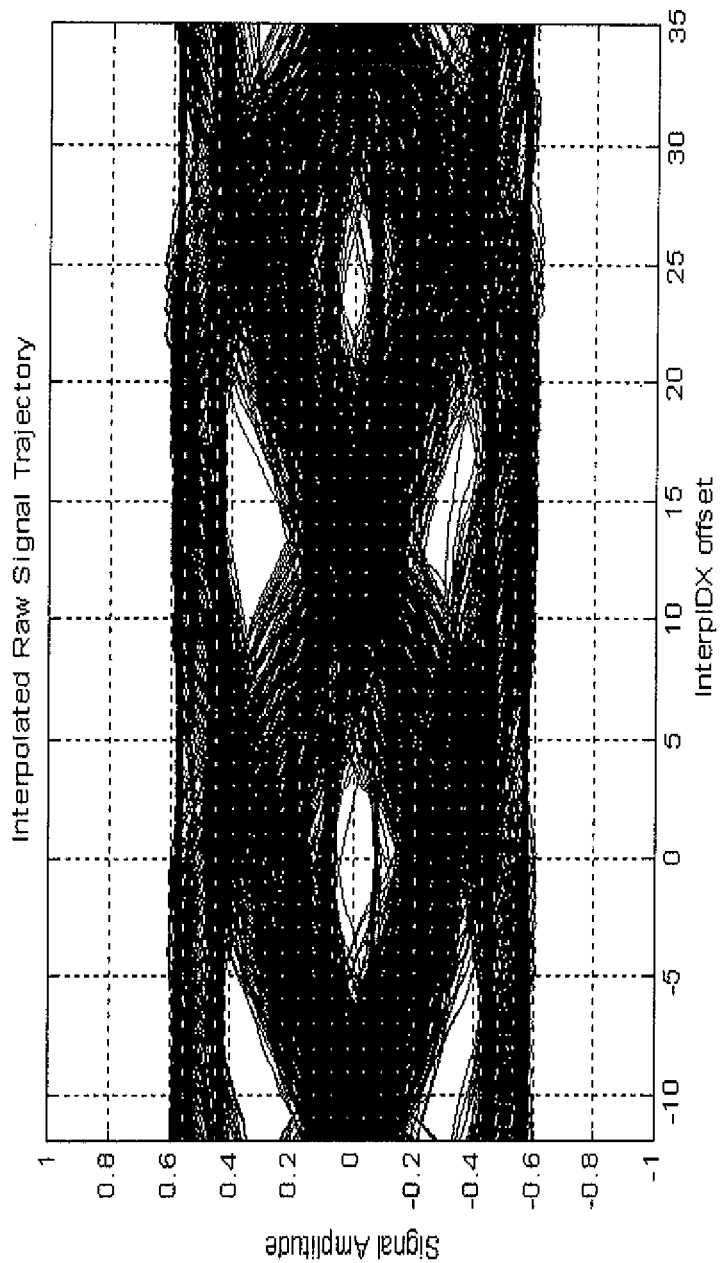
FIG. 9 is an exemplary trajectory eye diagram of the raw samples before equalization in the receive path as produced in accordance with an embodiment of the present application.
Figure 10:
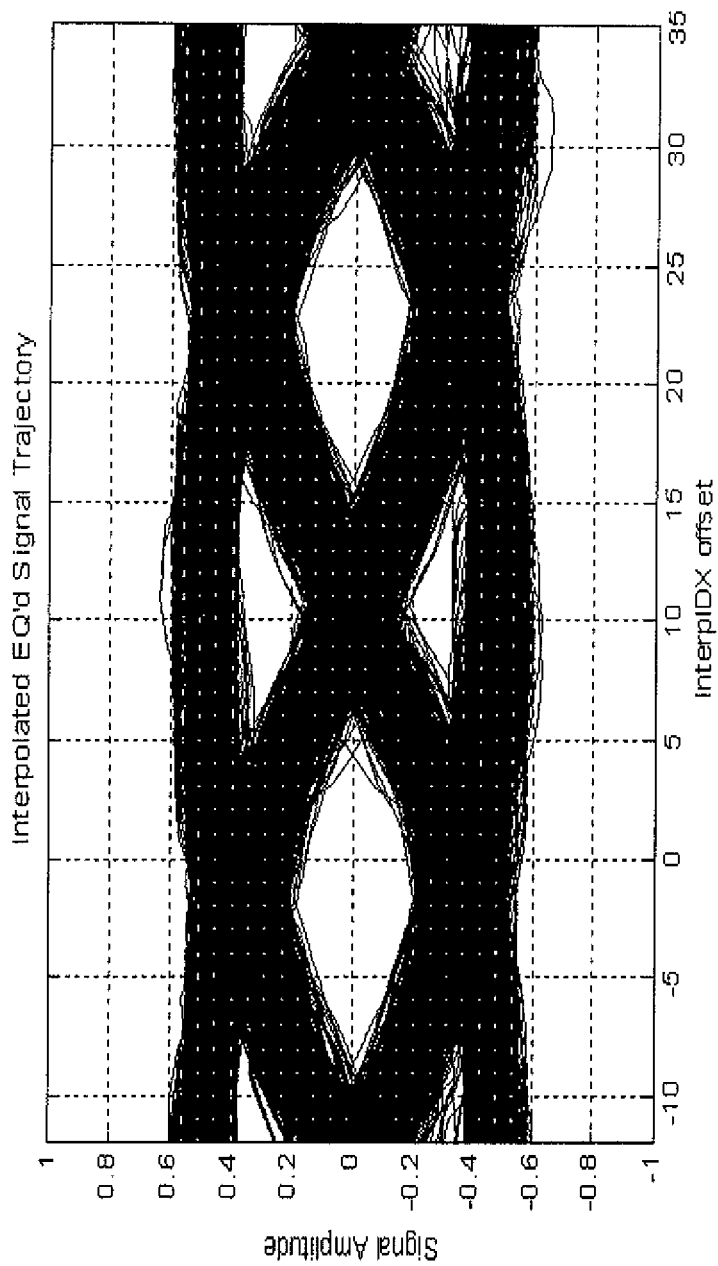
FIG. 10 is an exemplary trajectory eye diagram of the raw samples after equalization in the receive path as produced in accordance with an embodiment of the present application.

FIG. 9 is an exemplary trajectory eye diagram of the raw samples before equalization in the receive path, as produced in accordance with an embodiment of the present application. FIG. 10 is an exemplary trajectory eye diagram of the raw samples after equalization in the receive path, as produced in accordance with an embodiment of the present application. From the same block of collected data one can create the trajectory eye plots (the "classical eye diagram"), as shown in FIG. 9 (pre EQ) and FIG. 10 (post-EQ). Here, rather than just saving the histogram of amplitudes over a unit interval (UI), one would need to keep vectors to show the trajectory. In general, while this gives a better visualization than the statistical plot, it takes much more memory and is less useful than the bathtub curve. To make the plot look "nice", one would typically use many more interpolation points than what the hardware DSP uses. This can again be done both pre and post equalization.

Figure 11:
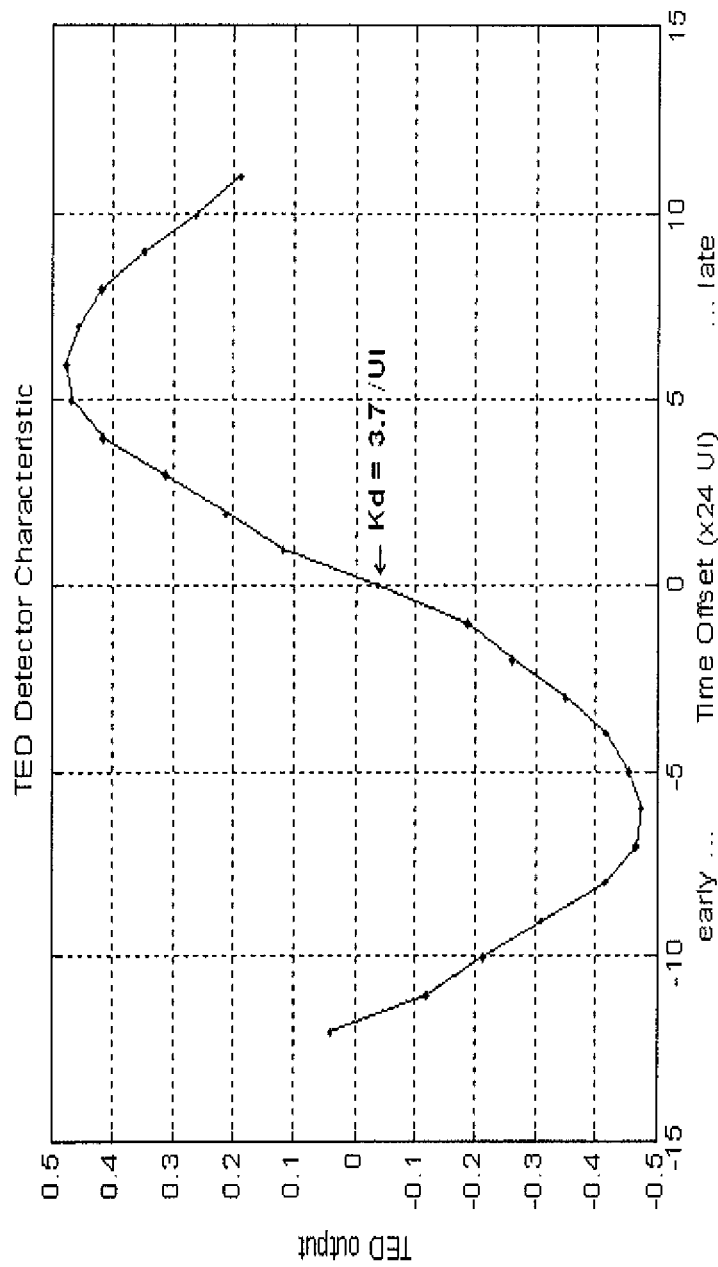
FIG. 11 is an exemplary plot of the timing error estimate as produced in accordance with an embodiment of the present application.
Figure 12:
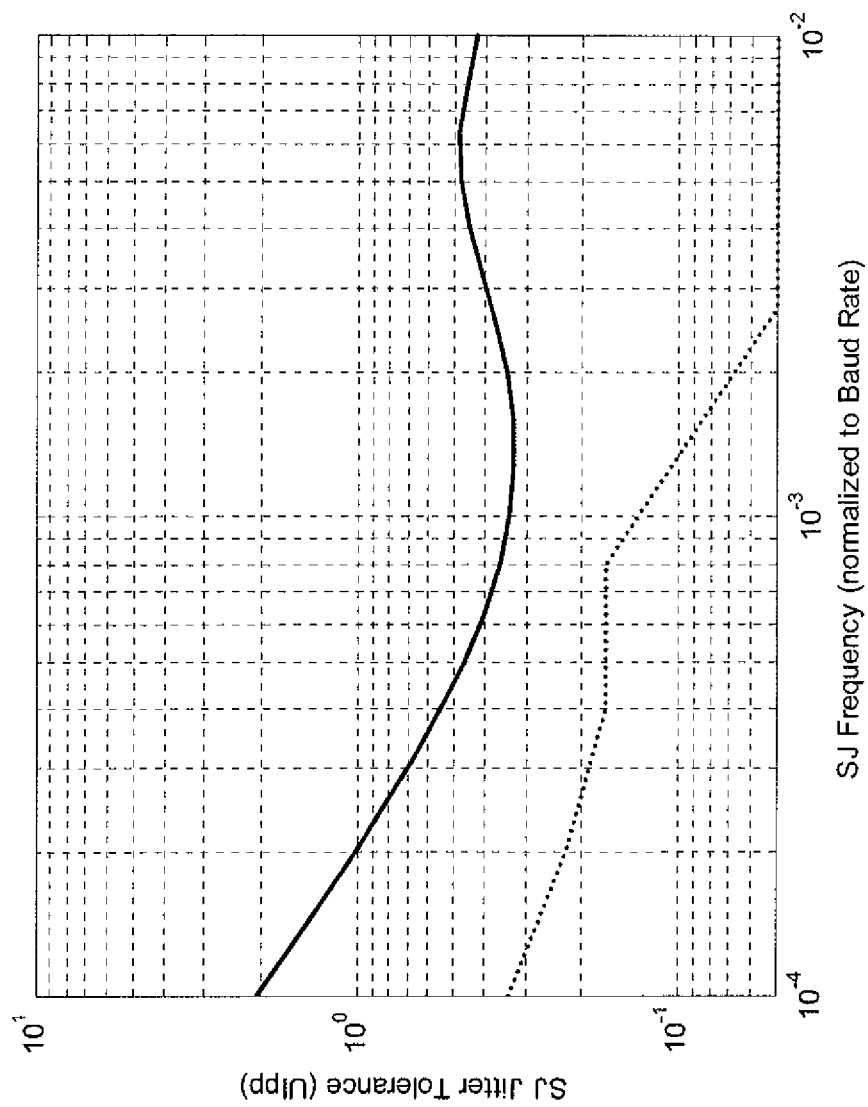
FIG. 12 is an exemplary plot of SJ jitter tolerance curve from timing error estimates as produced in accordance with an embodiment of the present application.

FIG. 11 is an exemplary plot of the timing error estimate as produced in accordance with an embodiment of the present application. Referring to FIG. 11, an estimate of the timing error detection block from the same block of collected data. With this data and using a very simplified model, one can predict the shape of the SJ tolerance curve and compare it to the requirements (lower doted line in FIG. 12). FIG. 12 is an exemplary plot of SJ jitter tolerance curve from timing error estimates as produced in accordance with an embodiment of the present application. The simplified model can for example be similar to the model proposed in "Effect of Loop Delay on Phase Margin of First Order and Second-Order Control Loops", by J. W. M Bergmans, IEEE Transactions on circuits and systems, Vol 52, pages 621 to 625. Other methods such as numerically modeling the sample-by-sample operation of the timing block assuming an ideal, or any arbitrary piece-wise linear, detector characteristic can also be used.

Figure 13:
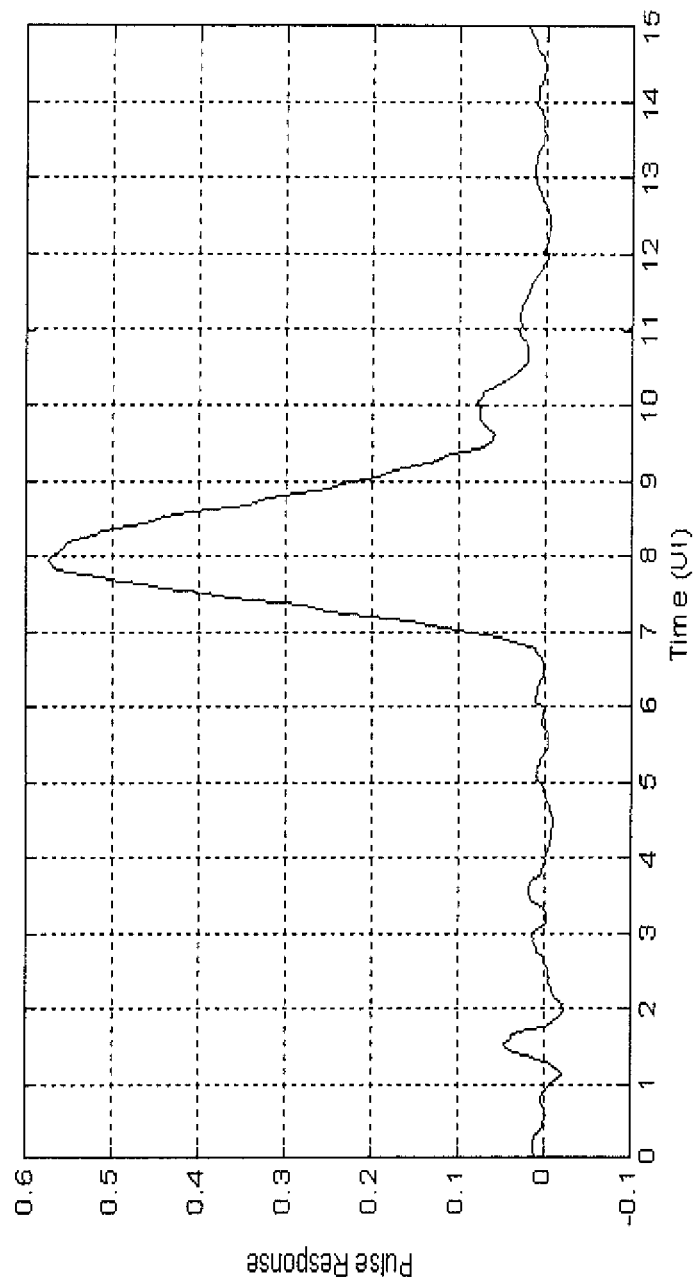
FIG. 13 is an exemplary plot of the channel pulse response as produced in accordance with an embodiment of the present application.
Figure 14:
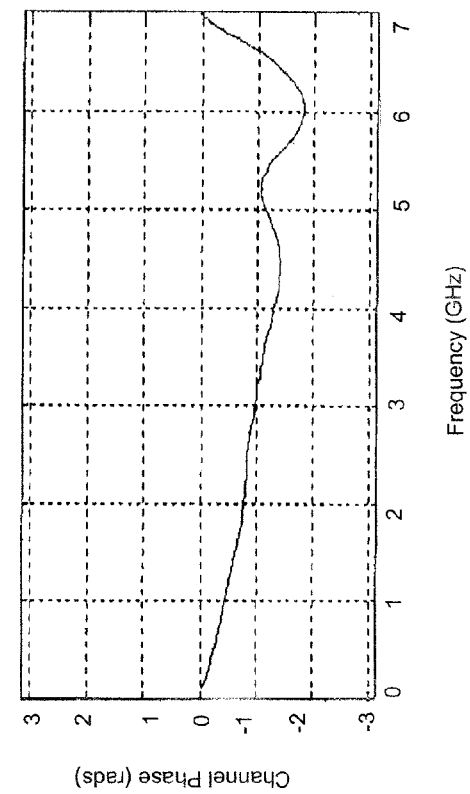
FIG. 14 is an exemplary plot of the channel S-parameters from the pulse response as produced in accordance with an embodiment of the present application.
Figure 14:
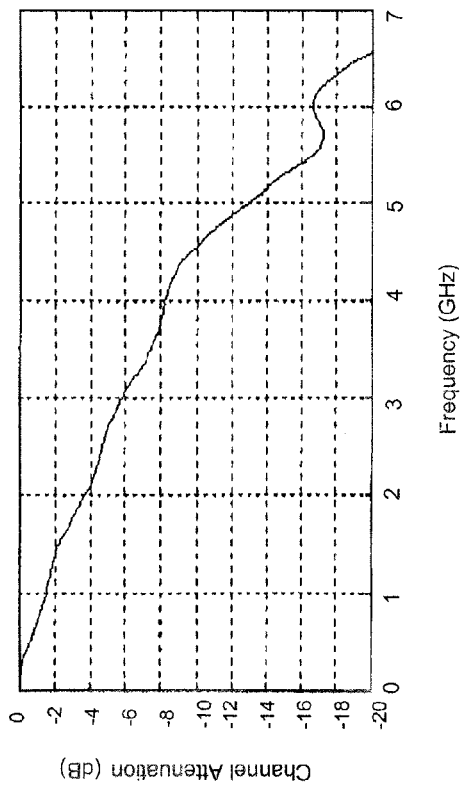

FIG. 13 is an exemplary plot of the channel pulse response as produced in accordance with an embodiment of the present application. From the same block of collected data, one can extract the pulse response that created the sliced data pattern. The more UI of data used, the better the estimate. The illustrated exemplary response is for the full channel and includes the Tx driver, the Tx package, the channel response (including traces, vias and connectors), the Rx package and the Rx path inside the receiving chip (including the ADC). Further this can be converted into a S21 frequency response using well known DFT methods. FIG. 14 is an exemplary plot of the channel S-parameters from the pulse response as produced in accordance with an embodiment of the present application.

From the same block of collected data, one can decompose the jitter of the data stream (both pre and post equalization) using techniques such as described in U.S. Pat. No. 7,388,937 by modifying the TIE timestamps between blocks of data so that the algorithm does not look for transitions between data blocks. Another way to do this would be to only work within each block of data, then merge the random jitter (RJ), data dependent random jitter (DDRJ), deterministic jitter (DJ), probabilistic jitter (PJ), data dependent jitter (DDJ), bounded uncorrelated jitter (BUJ), intersymbol interference (ISI), and duty cycle distortion (DCD) between blocks using either max or averaging functions as appropriate.

One can also work without either the timing point or the equalization tap values and estimate them based on just the raw data.

Figure 15:
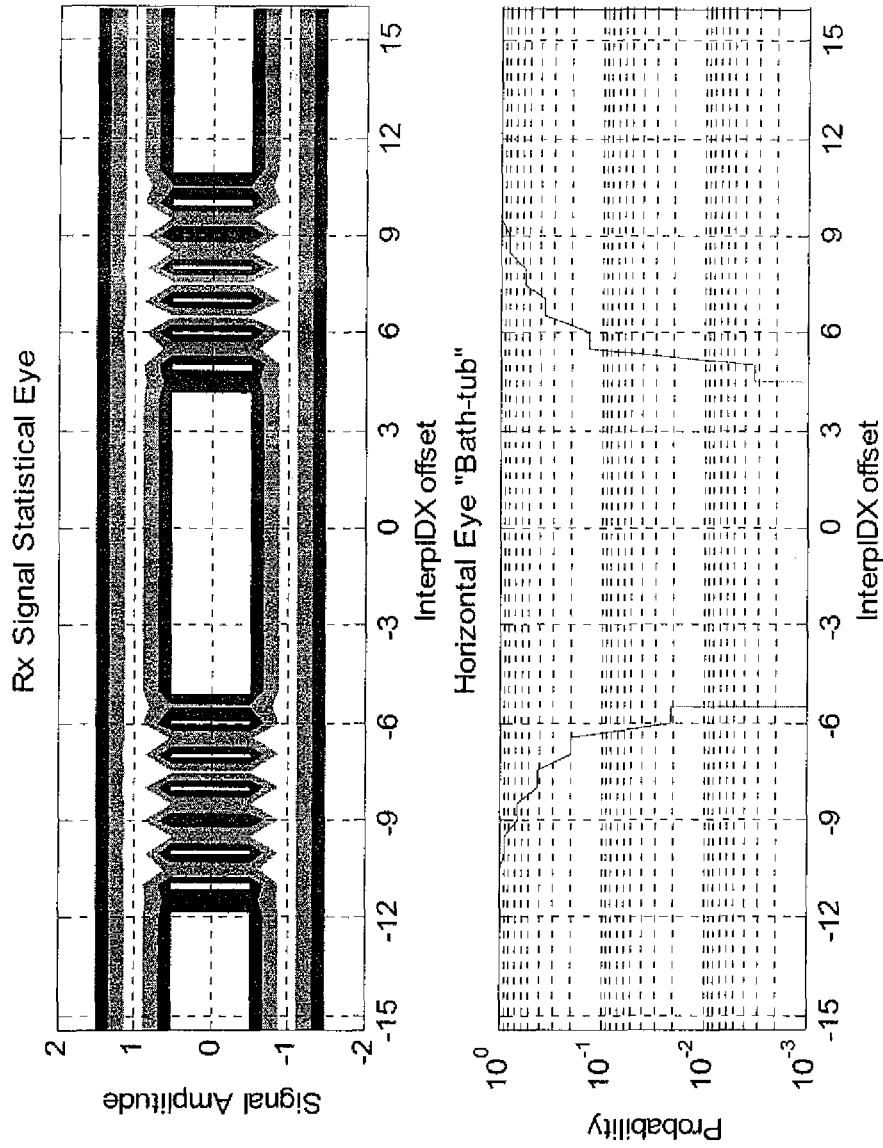
FIG. 15 illustrates exemplary slicer-based statistical eye diagram and bathtub curve as produced in accordance with an embodiment of the present application.

The raw data does not have to be ADC, it can also just be slicer data. In this case the resulting data is much more restrictive (that is can only provide "Statistical Eye Plots" in FIG. 15, "Estimation of TED Detector Characteristics" same as FIG. 11 and "SJ jitter tolerance curve from Timing Error Estimate" which is the same as FIG. 12). In order to obtain a proper voltage axis for the statistical eye plot, one can need to revert back to the standard methods of offsetting the slicer or the data (i.e. need to be in a test mode or have a second sampling path). FIG. 15 illustrates exemplary slicer-based statistical eye diagram and bathtub curve as produced in accordance with an embodiment of the present application.

In an embodiment, the present application provides a method for monitoring margins in a SerDes link with a receiver that uses an N-bit (N>1) over-sampled front end that operates in a normal operating mode with arbitrary serial traffic; does not require additional sampling circuitry, other than some extra memory to temporally store a block of adjacent incoming signal samples; where the sampling system interpolates timing points between sampling clock points; and the stored data is then processed to estimate the SerDes's state (i.e. the timing phase, the equalization setting, any gains, etc).

The processing can be performed according to a block sub-sampling method using small contiguous blocks of the data to reduce RTL/firmware/software load, or by using all the incoming data. The block sub-sampling comprises sampling at more than twice the maximum signal frequency, but only examining small blocks of data at a time, such as blocks of 4, 8, 16, 24, 32 or 48 UI (or baud). This is in contrast to traditional sampling methods where the sampling rate is much less than twice the maximum signal frequency. The Rx sampling clock can be asynchronous or synchronous to the received data. The data can be processed to generate a statistical eye plots both before and after any internal equalization. The data can be processed to generate bathtub plots. The data can be processed to generate trajectory eye plots both before and after any internal equalization.

The data can be processed to generate an estimation of TED characteristics. The TED curve can be used to estimate SJ jitter tolerance of the link. The data can be processed to generate an estimation of complete Channel Impulse Response. The complete Channel Impulse Response can be run into an DFT to estimate the S-parameters of the complete channel (that is convert the z-domain data into s-domain). The data can be processed to generate an estimation of the decomposed jitter of the complete channel.

In another embodiment, the present application provides a method for monitoring margins in a SerDes link with a receiver that uses an 1-bit over-sampled front end that operates in a normal operating mode with arbitrary serial traffic; and does not require additional sampling circuitry, other than some extra memory to temporally store a block of adjacent incoming signal samples together with a snapshot of the state of the SerDes (for example, the current selected timing point phase, gains in the path, etc).

The processing can be performed according to block sub-sampling using small contiguous blocks of the data (i.e. block sub-sampling) to reduce RTL/firmware/software load, or using all incoming data. The Rx sampling clock can be asynchronous or synchronous to the received data. The data can be processed to generate a statistical eye plots both before and after any internal equalization. The data can be processed to generate bathtub plots. The data can be processed to generate an estimation of TED characteristics. The TED curve can be used to estimate SJ jitter tolerance of the link.

In a further embodiment, the present application provides a method for monitoring margins in a SerDes link with a receiver that uses an 1-bit over-sampled front end that operates in a normal operating mode with arbitrary serial traffic; does not require any extra sampling head hardware, other than some extra memory to temporally store a block of adjacent incoming signal samples; and the stored data is then processed to estimate the SerDes's state (i.e. the timing phase, any gains, etc).

The processing can be either done using block sub-sampling methods or using all incoming data. The Rx sampling clock can be asynchronous or synchronous to the received data. The data can be processed to generate a statistical eye plots both before and after any internal equalization. The data can be processed to generate bathtub plots. The data can be processed to generate an estimation of TED characteristics. The TED curve can be used to estimate SJ jitter tolerance of the link.

In the preceding description, for purposes of explanation, numerous details are set forth in order to provide a thorough understanding of the embodiments. However, it will be apparent to one skilled in the art that these specific details are not required in order to practice the embodiments. In other instances, well-known electrical structures and circuits are shown in block diagram form in order not to obscure the embodiments. For example, specific details are not provided as to whether the embodiments of the application described herein are implemented as a software routine, hardware circuit, firmware, or a combination thereof.

Embodiments of the application can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the application. Those of ordinary skill in the art will appreciate that other instructions and operations necessary to implement the described application can also be stored on the machine-readable medium. Software running from the machine-readable medium can interface with circuitry to perform the described tasks.

The above-described embodiments are intended to be examples only. Alterations, modifications and variations can be effected to the particular embodiments by those of skill in the art without departing from the scope of the application, which is defined solely by the claims appended hereto.

What is claimed is:
1. A method of determining performance of a Serializer/Deserializer (SerDes) link including a receive path, comprising:
capturing digitized samples spanning multiple baud periods of a received signal waveform during normal operation in the receive path of a SerDes receiver into a memory without affecting normal operation of the SerDes link in the receive path;
capturing the SerDes link timing into a memory without affecting normal operation of the SerDes link in the receive path, or calculating the SerDes link timing from the captured digitized samples of the received signal waveform;
capturing the SerDes link equalization states into a memory without affecting normal operation of the SerDes link in the receive path, or calculating the SerDes link equalization states from the captured digitized samples of the received signal waveform;
reconstructing the received signal waveform and an equalized signal waveform based on the captured digitized samples of the received signal waveform and either the captured or calculated timing and either the captured or calculated equalization states; and
determining performance of the SerDes link on the basis of the reconstructed received signal waveform and the reconstructed equalized signal waveform.

2. The method of claim 1, wherein capturing digitized samples, capturing the SerDes link timing, or capturing the SerDes link equalization states comprises obtaining a block of digitized samples using block sub-sampling.

3. The method of claim 2, wherein block sub-sampling comprises sampling the received signal waveform at or above a symbol rate while only examining small blocks of the received signal waveform at a time.

4. The method of claim 3, wherein the small blocks of the received signal waveform comprise at least four unit intervals.

5. The method of claim 1, wherein capturing digitized samples comprises Wig-capturing digitized samples using all incoming data associated with the received signal waveform.

6. The method of claim 1, wherein the obtained digital samples are captured into an N-bit wide block memory.

7. The method of claim 1, wherein determining performance of the SerDes link comprises monitoring margins of the SerDes link.

8. The method of claim 1, wherein capturing digitized samples comprises capturing a block of digitized samples at an output of an oversampled analog-to-digital converter of the SerDes receiver during normal operation of the SerDes link.

9. The method of claim 1, wherein reconstructing the received signal waveform and the equalized signal waveform comprises interpolating the stored block of input samples based on the captured or calculated timing information to reconstruct a digital representation of the received signal waveform at a finer time resolution than provided by the oversampled analog-to-digital converter.

10. The method of claim 9, wherein determining the performance of the SerDes link is based on the interpolated digital representation of the received signal waveform and an equalized digital representation of the reconstructed signal waveform.

11. The method of claim 1, wherein determining performance of the SerDes link comprises generating a statistical eye plot using the reconstructed received signal waveform and the equalized signal waveform.

12. The method of claim 1, wherein determining performance of the SerDes link comprises generating bathtub plots using the reconstructed waveform and the equalized signal waveform.

13. The method of claim 1, wherein determining performance of the SerDes link comprises generating trajectory eye plots using the reconstructed waveform and the equalized signal waveform.

14. The method of claim 1, wherein determining performance of the SerDes link comprises generating an estimation of timing error detection (TED) characteristics using the reconstructed waveform and the equalized reconstructed waveform.

15. The method of claim 14, wherein the TED characteristics are used to estimate sinusoidal jitter (SJ) tolerance of the link.

16. The method of claim 1, wherein determining performance of the SerDes link comprises generating an estimation of complete channel impulse response using the reconstructed received signal waveform and the equalized signal waveform.

17. The method of claim 16, further comprising running the complete Channel Impulse Response into a DFT (Discrete Fourier Transform) to estimate the S-parameters of the complete channel.

18. The method of claim 1, wherein determining performance of the SerDes link comprises generating an estimation of decomposed jitter of the complete channel using the reconstructed received signal waveform and the equalized signal waveform.

19. A computer readable memory storing statements and instructions for execution by a processor to perform a method of determining performance of a Serializer/Deserializer (SerDes) link including a receive path, the method including:

capturing digitized samples spanning multiple baud periods of a received signal waveform during normal operation in the receive path of a SerDes receiver into a memory without affecting normal operation of the SerDes link in the receive path;

capturing the SerDes link timing into a memory without affecting normal operation of the SerDes link in the receive path or calculating the SerDes link timing from the captured digitized samples of the received signal waveform;

capturing the SerDes link equalization states into a memory without affecting normal operation of the SerDes link in the receive path or calculating the SerDes link equalization states from the captured digitized samples of the received signal waveform;

reconstructing the received signal waveform and an equalized signal waveform based on the captured digitized samples of the received signal waveform and either the capture or calculated timing and either the captured or calculated equalization states; and determining performance of the SerDes link on the basis of the reconstructed received signal waveform and the reconstructed equalized signal waveform.

20. The computer readable memory of claim 19, wherein reconstructing the received signal waveform and the equalized signal waveform comprises interpolating the stored block of input samples based on the captured or calculated timing information to reconstruct a digital representation of the received signal waveform at a finer time resolution than provided by the analog-to-digital converter.

21. The computer readable memory of claim 20, wherein determining the performance of the SerDes link is based on the interpolated digital representation of the received signal waveform and an equalized digital representation of the reconstructed signal waveform.

* * * * *

UNITED STATES PATENT AND TRADEMARK OFFICE
CERTIFICATE OF CORRECTION

PATENT NO. : 8,467,436 B1
APPLICATION NO. : 12/627667
DATED : June 18, 2013
INVENTOR(S) : William Dean Warner et al.

It is certified that error appears in the above-identified patent and that said Letters Patent is hereby corrected as shown below:

In the Claims:

Column 12, line 30, claim 5, delete "comprises Wig-capturing" and insert therefor
-- comprises capturing --.

Signed and Sealed this
Thirteenth Day of August, 2013

Teresa Stanek Rea
*Acting Director of the United States Patent and Trademark Office*